United States Patent [19]

Medbury

[11] Patent Number: 4,652,100
[45] Date of Patent: Mar. 24, 1987

[54] IMAGE ACQUISITION SYSTEM AND MODULAR DESK UTILIZED THEREIN

[76] Inventor: Seward J. Medbury, 28785 Oak Point, Farmington Hills, Mich. 48018

[21] Appl. No.: 856,789

[22] Filed: Apr. 28, 1986

[51] Int. Cl.$^4$ ............................................. G03B 21/10
[52] U.S. Cl. ................................... 352/104; 352/133; 352/243; 353/37; 353/78; 353/97
[58] Field of Search ........................ 352/104, 133, 243; 353/37, 78, 94

[56] References Cited

U.S. PATENT DOCUMENTS

| | | | |
|---|---|---|---|
| 2,317,310 | 4/1943 | Stern | 353/78 |
| 2,460,350 | 2/1949 | Hinman | 352/133 |
| 3,040,622 | 6/1962 | Reddle et al. | 352/104 |
| 3,051,040 | 8/1962 | Davis | 352/104 |
| 3,169,442 | 2/1965 | Reddle et al. | 353/37 |
| 3,179,002 | 4/1965 | Carpenter | 353/37 |
| 3,578,857 | 5/1971 | Busch | 353/94 |

Primary Examiner—Monroe H. Hayes
Attorney, Agent, or Firm—Brooks & Kushman

[57] ABSTRACT

An image acquisition system including at least two image projectors, a television camera and a modular desk for supporting the projectors and the camera wherein the image projectors are supported at predetermined locations on a tabletop supported for sliding and rotary movement so that the camera can receive projected images from a desired one of the image projectors by merely adjusting the angular position between the tabletop and a lower cabinet of the desk. The desk includes an upper cabinet having an image acquisition aperture formed therethrough and aligned with the desired one of the image projectors. The modular desk also includes a slab supported on the lower cabinet. In one embodiment of the invention a movable table supports the tabletop. In a second embodiment the tabletop is slidably and rotatably supported on a pair of spaced tracks mounted on the top surface of the slab. Preferably, the camera is supported outside the upper cabinet aligned with a second image acquisition aperture formed through the upper cabinet and a mirror disposed therein to reflect the projected image.

14 Claims, 9 Drawing Figures

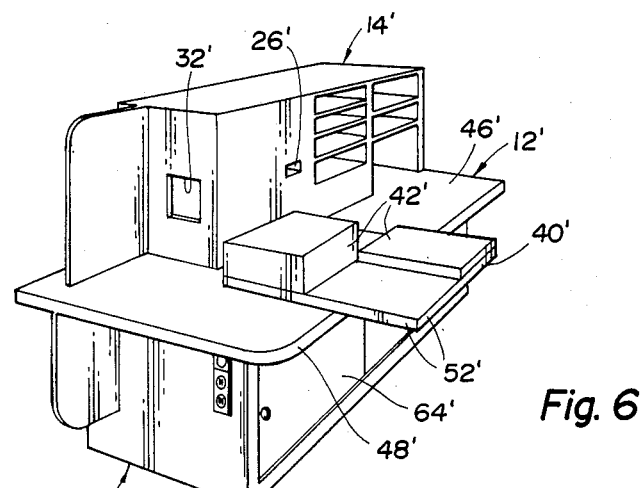
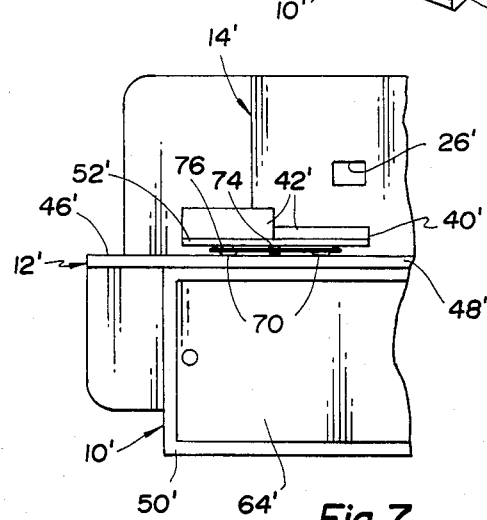
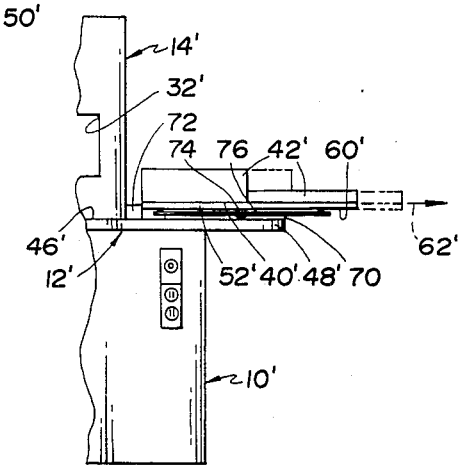
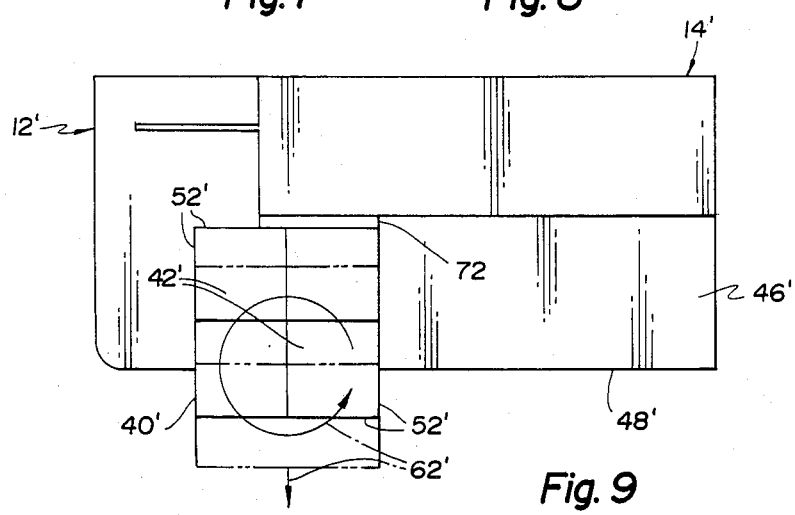

IMAGE ACQUISITION SYSTEM AND MODULAR DESK UTILIZED THEREIN

TECHNICAL FIELD

This invention relates to image acquisition systems and a modular desk utilized therein and, in particular, to image acquisition systems and a modular desk utilized therein wherein a desired one of a number of image projectors may be utilized for projecting images for subsequent reception by a single camera by simply changing the angular orientation of a movable tabletop supporting the image projectors relative to the rest of the desk.

BACKGROUND ART

The prior art discloses a variety of video transfer systems which are capable of transferring photographs, negatives, slides, 8-millimeter film and artwork directly onto video tapes. Such video transfer systems typically include the ability to include special effects, such as stereo sound, voice-overs, zooms, fades, titles, scrolling capability, etc.

Video transfer systems have come into vogue principally because of the large number of VCRs which have been sold and which are projected to be sold. These systems typically include components such as a video editing recorder, a video camera, a color monitor, a stereo cassette tape deck, various amplifiers, special effects generators and image projectors for 8-millimeter film, 16-millimeter film, photos, negatives and prints.

Because of the large number of various components which are utilized in such systems to accommodate the large number and variety of images to be transferred onto video cassettes, these systems quickly become complicated and unwieldly. Oftentimes, a large amount of time is required in setting up and aligning the imaging devices so that the system can properly transfer a particular image, such as an image captured on a slide.

Stability is also a problem with the use of such prior art systems after the various components have been aligned. For example, slight relative movement inadvertently caused between a desired image projector and the receiving camera may result in improperly captured images which can only be corrected by the investment of time and expense by the operator.

Also, such systems oftentimes occupy a large amount of floor space or, in other words, have a large "footprint" thereby increasing the operating or overhead expense to the user of such a system.

The following United States patents disclose various recording, communication and information retrieval equipment which are generally related to the invention disclosed hereinbelow U.S. Pat. Nos. 2,477,923; 2,304,490; 3,040,622; 3,471,947 and 4,046,437.

DISCLOSURE OF THE INVENTION

An object of the present invention is to provide an improved image acquisition system and modular desk utilized therein which is versatile enough to handle a number of image projectors to process desired projected images accurately, yet quickly, without utilizing a large amount of floor space.

Another object of the present invention is to provide an improved image acquisition system and modular desk utilized therein, wherein a different image may be projected to a television camera by merely changing the angular position of a movable tabletop with respect to an upper cabinet of the desk and wherein the resulting projecting position is positively secured after the angular adjustment.

In carrying out the above objects and other objects of the present invention, a modular desk is provided, including a lower cabinet and a slab supported on the lower cabinet. The slab has a relatively smooth, flat horizontal top surface. Also included is an upper cabinet having an image acquisition aperture formed therethrough. A tabletop is supported for sliding and rotary movement between at least two projecting positions. The tabletop has a top surface adapted to support an arrangement of image projectors at predetermined locations thereon. The tabletop has a plurality of circumferentially spaced side edge portions. A stop mechanism is supported above the lower cabinet for stopping sliding and rotary movement of the tabletop. The stop mechanism abuttingly engages one of the side edge portions in each of the projecting positions. As a result, an image projected by a desired one of the image projectors is projected through the image acquisition aperture in each of the projecting positions.

Further in carrying out the above objects and other objects of the present invention, an image acquisition system comprises the modular desk as disclosed above and further comprises at least two image projectors for projecting images and a television camera, all of which are supported on the desk. The camera receives the projected images from a desired one of the image projectors through the image acquisition aperture and converts the images into electrical signals. The image projectors are supported at predetermined locations on the top surface of the tabletop. Preferably, the system includes a mirror located within the upper cabinet and aligned with the image acquisition aperture. Also, preferably, the upper cabinet includes a second image acquisition aperture formed therethrough and aligned with the camera and the mirror so that the mirror reflects the projected image through the second image acquisition aperture to the camera.

Also, preferably, at least one block is supported on a portion of the top surface of the tabletop and has a top surface on which a single image projector is to be supported to thereby vary the effective height of the top surface of the tabletop.

The advantages accruing to an image acquisition system and modular desk as provided above are numerous. For example, a wide variety of image storing media may be processed by merely changing the angular position between the upper cabinet and the movable table. Such adjustment can be performed quickly, without sacrificing precision and without the need for a large amount of floor space. Also, after the adjustment is made, the resulting relationship between the upper cabinet and the tabletop is secure.

Other advantages of the present invention will be readily appreciated as the same becomes better understood by reference to the following detailed description when considered in connection with the accompanying drawings.

BRIEF DESCRIPTION OF THE DRAWINGS

FIG. 6 is a perspective view of a second embodiment of a modular desk constructed in accordance with the present invention;

FIG. 7 is a front dimensional view, partially broken away, of the second embodiment;

FIG. 8 is a side elevational view, partially broken away, of the second embodiment with a tabletop illustrated in phatom in an adjustment position; and FIG. 9 is a top plan view showing the various movements of the tabletop of FIG. 8 required to utilize a different image projector to project images.

BEST MODE FOR CARRYING OUT THE INVENTION

Figure 1:
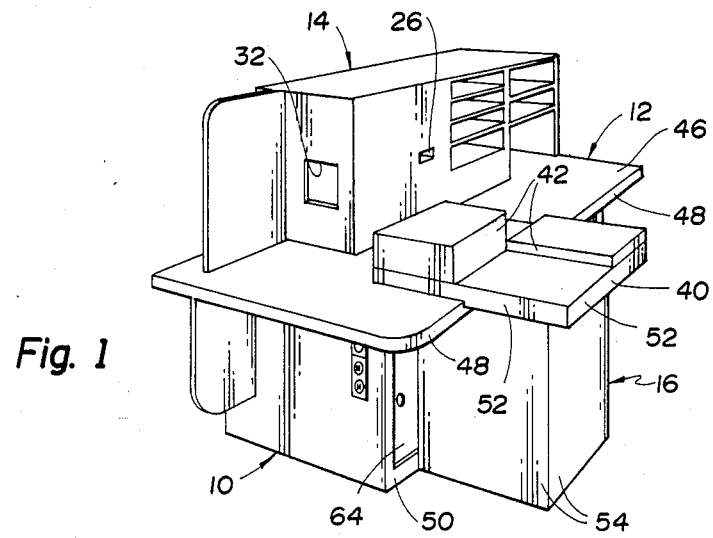
FIG. 1 is a perspective view of a first embodiment of a modular desk constructed in accordance with the present invention.
Figure 2:
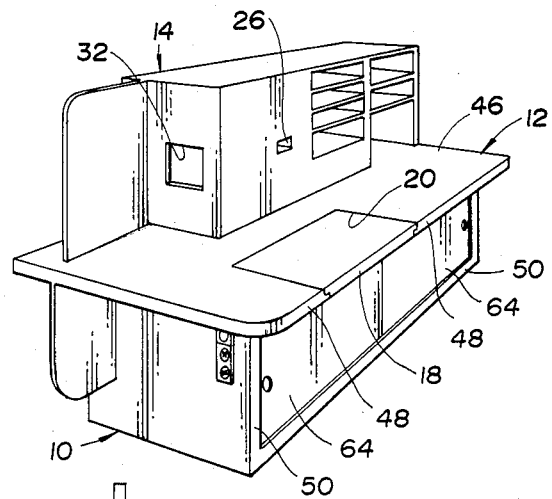
FIG. 2 is a perspective view similar to the view of FIG. 1 wherein a removable table of the modular desk has been moved and replaced with a leaf.

Referring to FIGS. 1 and 2 there is illustrated one embodiment of a modular desk constructed in accordance with the present invention. The modular desk generally includes a lower cabinet, generally indicated at 10, a slab, generally indicated at 12, fixedly supported on the lower cabinet 10, a hollow upper cabinet, generally indicated at 14, supported on the slab 12 and a movable table, generally indicated at 16. When the table 16 is not being utilized with the rest of the modular desk, a removable leaf 18 may be utilized to fill the resulting recess 20 formed in the slab 12.

Figure 3:
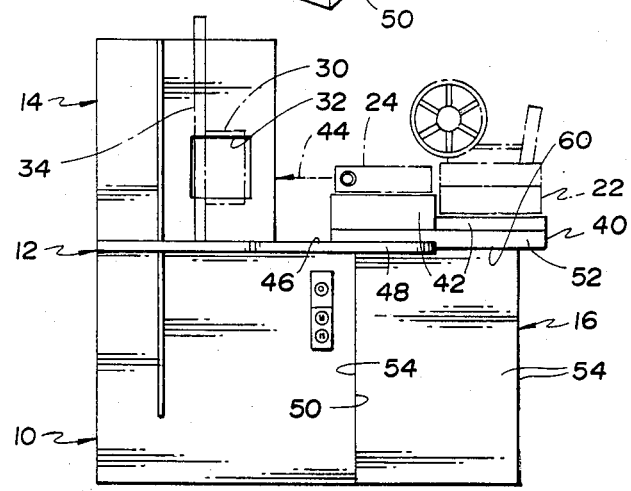
FIG. 3 is a side elevational view of the desk of FIG. 1 including various image projectors and a camera shown in phantom in operative position relative to the modular desk.
Figures 4, 5:
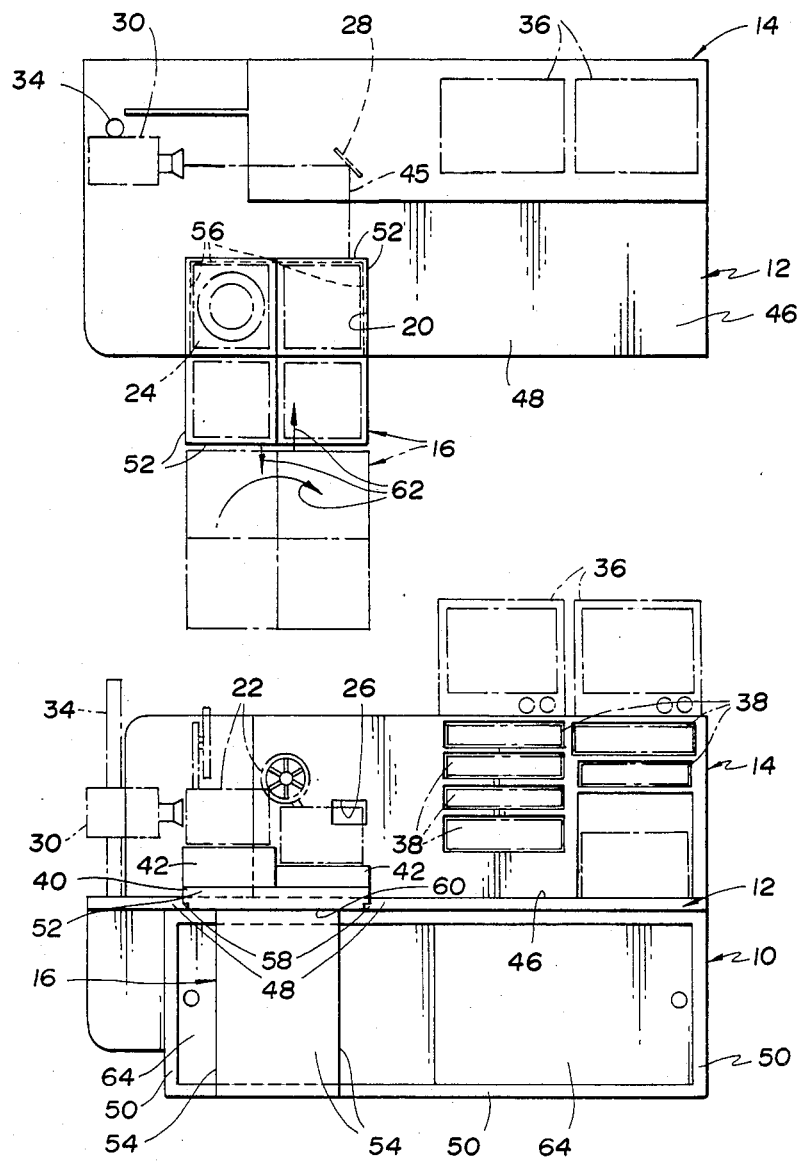
FIG. 4 is a top plan schematic view of a first embodiment of an image acquisition system constructed in accordance with the present invention showing the various movements of the movable table required to utilize a different image projector to project images.
FIG. 5 is a front elevational view of the image acquisition system with the various image projecting and processing equipment illustrated in phantom.

As illustrated in FIGS. 3 through 5, the table 16 supports a wide variety of image projecting equipment such as different types of movie projectors 22 and a slide projector 24. A desired one of the image projecting equipment is positioned adjacent the upper cabinet 14 so that the images are projected through a first image acquisition aperture 26 formed in the upper cabinet 14. The projected images are reflected by a mirror 28 located within the upper cabinet 14 and are thereafter received by a television camera 30 after exiting the upper cabinet 14 through a second image acquisition aperture 32. A television camera is aligned with the aperture 32 and is adjustably mounted on a camera stand 34 which is, in turn, supported on the upper slab 12.

After the television camera 30 receives the reflected projected image, it converts the images into electrical signals for further transmission thereof to video equipment, such as TV monitors 36 and electronic equipment 38, such as VCRs, amplifiers, receivers and the like supported by the upper cabinet 14. Such electronic equipment 38, for example, has the capabilities of providing special effects such as fades, wipes and dissolves. Such electronic equipment 38 may further have the capability of providing titles and captions on the images received by the camera 30. Also, such electronic equipment 38 may provide voice and/or music with the images which are subsequently placed on cassette tape.

In order that the projected images are properly and consistently projected through the image acquisition aperture 26, the tabletop 40 of the table 16 is provided with rectangular blocks 42 having various heights, so that the image projectors 22 and 24 supported thereon, project their respective images at a constant, predetermined height as indicated by arrow 44 in FIG. 3. Also, the image projectors 22 are arranged at predetermined locations on the tabletop 40 to project their respective images at a constant, predetermined lateral position as indicated by arrow 45 in FIG. 4.

The slab 12 includes a relatively smooth, flat, horizontal top surface 46 which serves as a work surface for an operator of the image acquisition system. A front edge portion 48 of the slab 12 overhangs the lower cabinet 10 at its vertical front surface 50. The recess 20 is formed in the front edge portion 48 and defines a female half of a male/female connection with the tabletop 40 of the table 16. The male half of the male/female connection is alternately provided by a selected one of the side edge portions 52 of the tabletop 40 which overhang the vertical side surfaces 54 of the table 16.

When the table 16 is joined to the lower cabinet 10 by any one of the male/female connections in a corresponding joined position, a desired one of the image projectors 22 or 24 is adjacent the image acquisition aperture 26 and a corresponding vertical side surface 54 of the table 16 abuts the vertical front surface 50 of the lower cabinet 10, as best shown in FIG. 3. In this way, the male/female connection between the table 16 and the lower cabinet 10 is positively secured.

Referring now to FIG. 4, there is illustrated the various movements of the table 16 (i.e. by arrows 62) in order to change the angular orientation of the table 16 with respect to the slab 12 in order to align a different image projector with the image acquisition aperture 26.

To further ensure the positive male/female connection between the table 16 and the lower cabinet 10, the recess 20 is defined by a step-shaped edge 56 which extends completely about the recess 20 in the slab 12 as shown in phantom in FIG. 4. A similar, complementarily-formed, step-shaped edge 58 is formed in the bottom surface 60 of the overhanging side edge portions 52 to further secure the male/female connection between the table 16 and the lower cabinet 10. Likewise, the leaf 18 has side edge portions also formed with a complementary step-shaped edge in order to substantially and securely fill the recess 20, as best shown in FIG. 2.

The lower cabinet 10 includes a pair of sliding doors 64 located in its front surface 50 in order to provide access to the contents of the lower cabinet 10. Various items may thus be stored within the lower cabinet 10. The modular desk is designed so that even when the table 16 is connected to the lower cabinet 10 in one of its joined positions, the doors 64 are still accessible to a user of the system.

Referring now to FIGS. 6 through 9, there is illustrated a second embodiment of a modular desk constructed in accordance with the present invention, generally indicated at 10'. Parts and elements of the second embodiment which are substantially identical to the corresponding parts and elements of the first embodiment have the same reference numeral, but have a prime designation. New parts have new reference numerals.

Instead of supporting a tabletop 40' on a table 16, the tabletop 40' is slidably mounted on the top surface 46' of the slab 12' by tracks 70 which, in turn, are fixedly mounted on the top surface 46'. After being slid from the solid line position to the phantom line position in FIG. 9, the tabletop 40' is rotated as indicated by arrows 62'. The tabletop 40' is constructed much like a lazy Susan in order to rotate to thereby change its angular orientation with respect to the upper cabinet 14'. In particular, the tabletop 40' is rotatably supported by a pin 74 on a plate 72 which, in turn, is adapted to slide on the tracks 70 at its lower surface thereof. One end of the pin 74 is fixed to the tabletop 40' and the other end of the pin 74 is rotatably supported by the plate 72.

A stop means or mechanism in the form of a block 72 is supported on the top surface 46' in abutting engagement with the front surface of the upper cabinet 14' and with a selected one of the side edge portions 52' of the tabletop 40' after the change in angular orientation. In this way, the tabletop 40' is secured adjacent the aperture 46' against rotary movement thereof.

The advantages accruing to an image acquisition system and modular desk utilized therein as described above are numerous. For example, various image projectors may be utilized to project images from media, such as movie film, slides and the like which images are captured by a single camera by merely changing the angular position of the tabletop 40 or 40' with respect to the upper cabinet 14 or 14', respectively. Also, the "footprint" of the desk is relatively small so as not to utilize an excess amount of floor space.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

What is claimed is:

1. A modular desk comprising:
   a lower cabinet;
   a slab supported on said lower cabinet, said slab having a relatively smooth, flat, horizontal top surface;
   an upper cabinet having an image acquisition aperture formed therethrough;
   a tabletop supported for sliding and rotary movement between at least two projecting positions, said tabletop having a top surface and adapted to support an arrangement of image projectors at predetermined locations thereon, the tabletop having a plurality of side edge portions; and
   stop means supported above said lower cabinet for stopping sliding and rotary movement of said tabletop wherein said stop means abuttingly engages one of said side edge portions in each of said projecting positions, whereby an image projected by a desired image projector is projected through the image acquisition aperture in each of said projecting positions.

2. The desk as claimed in claim 1 further comprising at least one block having a top surface, the block being supported on a portion of the top surface of the tabletop, the top surface of the block being adapted to receive and retain a single image projector thereon, to thereby vary the effective height of the top surface of the tabletop.

3. The desk as claimed in claim 1 wherein said slab has a recess formed in front edge portion thereof to define a female half of a male/female connection, each of said side edge portions defining a male half of the male/female connection.

4. The desk as claimed in claim 3 wherein said recess is defined by a step-shaped edge and wherein the bottom surface of the tabletop is formed with a complementary step-shaped edge for abutting engagement with the step-shaped edge defining the recess.

5. The desk as claimed in claim 3 or claim 4 further comprising a leaf having a top surface, said leaf being complementarily formed to substantially fill said recess and adapted to be removably received and retained within said recess, the top surface of the leaf further defining the top surface of the slab.

6. The desk as claimed in claim 1 or claim 4 further comprising a movable table for supporting said tabletop wherein the lower cabinet has at least one door mounted for movement between open and closed positions at a vertical front surface thereof and wherein the plurality of side edge portions of the tabletop overhang a like plurality of vertical side surfaces of the table and wherein one of the side surfaces of the table abuts against the vertical front surface of the lower cabinet so that said door may be moved in each of the projecting positions.

7. An image acquisition system comprising:
   at least two image projectors for projecting images;
   a television camera for receiving the projected images from a desired one of the image projectors and converting the images into electrical signals; and
   a modular desk for supporting the image projectors and the camera, the desk including:
      a lower cabinet;
      a slab supported on said lower cabinet, said slab having a relatively smooth, flat, horizontal top surface;
      an upper cabinet having an image acquisition aperture formed therethrough and aligned with the desired one of said image projectors to permit the image to be projected therethrough;
      a tabletop supported for sliding and rotary movement between at least two projecting positions, said tabletop having a top surface, the image projectors being supported at predetermined locations thereon, the tabletop having a plurality of circumferentially spaced, side edge portions; and
   stop means supported above said lower cabinet for stopping rotary and sliding movement of said tabletop wherein said stop means abuttingly engages one of said side edge portions in each of said projecting positions wherein the camera is supported by the desk so that an image projected by the desired image projector is projected through the image acquisition aperture and is received by the television camera in each of said projecting positions.

8. The system as claimed in claim 7 further comprising at least one block having a top surface, the block being supported on a portion of the top surface of the tabletop, a single one of the image projectors being supported thereon, to thereby vary the effective height of the top surface of the tabletop.

9. The system as claimed in claim 7 wherein said slab has a recess formed in a front edge portion thereof to define the female half of a male/female connection, each of said side edge portions defining the male half of the male/female connection.

10. The system as claimed in claim 7 wherein said slab is defined by a step-shaped edge and wherein the bottom surface of the tabletop is formed with a complementary step-shaped edge for abutting engagement with the step-shaped edge defining the recess.

11. The system as claimed in claim 9 or claim 10 further comprising a leaf having a top surface, said leaf being complementarily formed to substantially fill said recess and adapted to be removably received and retained within said recess, the top surface of the leaf further defining the top surface of the slab.

12. The system as claimed in claim 7 or claim 10 further comprising a movable table for supporting said tabletop wherein the lower cabinet has at least one door mounted for movement between open and closed positions at a vertical front surface thereof and wherein the plurality of side edge portions of the tabletop overhang a like plurality of vertical side surfaces of the table and wherein one of the vertical side surfaces of the table abuts against the vertical front surface of the lower cabinet so that said door may be moved in each of the projecting positions.

13. The system as claimed in claim 7 further comprising a mirror located within said upper cabinet and aligned with said aperture for reflecting the projected image to the camera.

14. The system as claimed in claim 13 wherein said camera is supported exteriorly said upper cabinet, said upper cabinet having a second image acquisition aperture formed therethrough and aligned with said camera and said mirror and wherein said mirror reflects a projected image through the second image acquisition aperture to the camera.

* * * * *